UNITED STATES PATENT OFFICE.

ARTHUR A. BENNETT, OF ST. CHARLES, ILLINOIS, AND CHARLES S. BOYNTON, OF BURLINGTON, VERMONT, ASSIGNORS, BY DIRECT AND MESNE ASSIGNMENTS, TO THE NATIONAL MILK SUGAR COMPANY, OF BURLINGTON, VERMONT.

PROCESS OF MAKING LACTOSE OR MILK-SUGAR.

SPECIFICATION forming part of Letters Patent No. 439,717, dated November 4, 1890.

Application filed January 14, 1888. Renewed April 8, 1890. Serial No. 347,033. (No specimens).

*To all whom it may concern:*

Be it known that we, ARTHUR A. BENNETT, of St. Charles, in the State of Illinois, and CHARLES S. BOYNTON, of Burlington, in the State of Vermont, have invented certain new and useful Improvements in the Process of Making Lactose or Milk-Sugar, of which the following is a specification.

The object of this invention is to make pure, white, merchantable milk-sugar direct from whey without intermediate or successive crystallizations, and in sufficiently large quantity or percentage to render its manufacture profitable.

In all processes of manufacture of this article hitherto employed, whether what is known as the "Swiss process" or other processes more recently proposed, some of which have been patented within the past few years, there is obtained but a very small percentage of milk-sugar—say from one to one and one-fourth per cent. There is really much more sugar present in the whey and the loss arises from various causes—as for example, the long exposure of the sugar in solution in the whey to the action of the natural acid developed in the process of cheese-making, whereby the sugar is converted directly into acid or becomes inverted or reduced to a non-crystallizable molasses, sometimes known as "mother-liquor." Further loss is also produced by the operation of recrystallizing, and the large amount of washing necessary to free the sugar from the deleterious substances developed in the course of the sugar-making process.

One essential to the object which we have in view, is that all of the nitrogenous matter shall be completely and perfectly removed from the whey before it is evaporated to the crystallizing-point, and it is also desirable that all coloring-matter should be removed before it reaches this point, the result being a sirup, clear and white like water, which only needs to be evaporated to the crystallizing-point like any other sugar solution. To effect this complete and perfect removal of nitrogenous matter we first evaporate the whey (after subjecting it to preliminary filtration) to the consistency of sirup and then treat it in this condition with a strong solution of any of the reagents used in organic chemistry as tests for albumen, the object and effect of this treatment being to throw down all of the nitrogenous matter in the whey in the form of a thick precipitate from which the sirupy whey can readily be drawn off and separated.

To prevent the loss of sugar due to the hereinbefore-mentioned action of the natural acid developed in the whey by and during the cheese-making process, we neutralize the said acid by the use of hydrate or carbonate of lime or any other suitable neutralizer.

In detail the process which we preferably employ is as follows: On receiving the whey from the cheese-factories we first, by the use of either hydrate or carbonate of lime, carefully and exactly neutralize the acid already developed in the whey by and during the process of cheese-making. The quantity of neutralizer will vary according to the percentage of such acid present in the whey, and can be determined by testing the whey with neutral litmus-paper. This preliminary step is important in securing a larger yield of sugar from the whey, for the reason that, although the lactic fermentation is immediately arrested by heating the whey, as hereinafter provided, still the acid already produced and existing in the whey seems to have the power, unless it be neutralized, of converting quite a considerable percentage of the sugar into a molasses which will not crystalize. Having neutralized the whey, we immediately heat it to the boiling-point, which has the effect of precipitating to a considerable extent nitrogenous and other impurities. The liquid when separated from these matters is a greenish-colored liquid of somewhat turbid appearance. This liquid we evaporate, either by open or vacuum evaporation, to the consistency of a somewhat thick sirup, the evaporation being carried to limits varying between, say, from one-fourth of the original volume of whey to near the crystallizing-point. When the liquid is evaporated to one-half of its original volume, it will begin to show slight flocculent masses through it, and as it becomes more condensed it will contain quite a mass of nitrogenous matter in suspension. At this point we treat the hot sirup with a saturated solution of alum and washing-soda, taken in equal proportions. The proportion of this solution to the sirup must depend upon the skill, experience, and judgment of the operator. Different lots of whey require different quantities of the solution, depending upon the percentage of nitrogenous matters remaining in the whey after the first filtration. Sufficient of the solution should be used to precipitate all of the nitrogenous matter. For the successful attainment of this result the preliminary filtration or separation of the whey from the nitrogenous and other impurities first above referred to is a prerequisite, as is also the reduction in volume of this partially-purified whey to a sirupy state, because the nitrogenous matter which remains after the first filtration or separation, and which it is the object of the next succeeding step to remove, does not appear until the whey is reduced to this state. In lieu of the soda and alum, we may use nearly all vegetable and mineral acids except nitric, and all reagents that are used in organic chemistry as tests for albumen, together with a solution of rennet. A hot solution of the reagents is employed, because it holds more of the reagents and is, therefore, stronger. The result of this treatment is that all of the nitrogenous matter in the sirup is thrown down in a thick precipitate, from which the sirup can be separated readily in any of the ways commonly used for such purposes. We then again carefully neutralize this sirup with hydrate or carbonate of lime or any other suitable neutralizer. The sirup, which by this time is clear and of a light-brown color is next passed through bone-black filters. The clear white sirup resulting from this treatment is then evaporated *in vacuo* to the crystallizing-point, and is subsequently drawn off into tanks, where it is allowed to cool and crystallize. The resulting sugar product, which is in the form of white fine crystals, is slightly washed in iced water to remove the mineral salts, and is then dried, powdered, and put up in suitable shape for the market.

By the foregoing process we are enabled at the first crystallization to produce pure white marketable milk-sugar, and the yield we obtain is from three to three and one-half per cent.—that is to say, a yield at least twice as large as that obtained by other processes heretofore proposed or used.

Having now described our improvement in the process of making milk-sugar and the best way now known to us of carrying the same into practical effect, we remark in conclusion that what we believe to be essentially new herein and of our invention, is—

1. The described process of making milk-sugar from whey, consisting in preliminarily purifying the whey by heating it and separating it from the precipitate formed by and during the heating operation, next evaporating the partly-purified liquid to the consistency of sirup and treating it in this condition with chemical reagents—such as hereinbefore named—in solution for the complete precipitation of nitrogenous impurities, and finally filtering and evaporating the clear sirup thus obtained, substantially as and for the purposes hereinbefore set forth.

2. In the production of milk-sugar from whey, the method of effecting the removal of nitrogenous impurities from the body of the whey under treatment, which consists in preliminarily purifying the whey by heating it and separating it from the precipitate formed by and during the heating operation, then evaporating this partly-purified liquid to a sirupy consistency and treating it while in this state with alum and soda or their chemical equivalents in solution, substantially as and for the purposes hereinbefore set forth.

3. The described process of making milk-sugar from whey, consisting in first treating the whey with hydrate or carbonate of lime or equivalent neutralizing agent for the purpose of neutralizing the natural acid therein, next preliminarily purifying the whey by heating it and separating it from the precipitate formed by and during the heating operation, next evaporating the partly-purified liquid to the consistency of sirup and treating it in this condition with chemical reagents—such as hereinbefore named—in solution for the complete precipitation of nitrogenous impurities, and finally filtering and evaporating the clear sirup thus obtained, substantially as and for the purpose hereinbefore set forth.

In testimony whereof we have hereunto set our hands this 28th day of December, 1887, and 5th day of January, 1888.

ARTHUR A. BENNETT.
CHARLES S. BOYNTON.

Witnesses to the signature of Arthur A. Bennett:
FRANK W. ALEXANDER,
C. J. PACKER.

Witnesses to the signature of Charles S. Boynton:
CARROLL DOUBLEDAY,
ARTHUR R. ST. PETER.